United States Patent
Nowaczyk

Patent Number: 6,037,077
Date of Patent: Mar. 14, 2000

[54] ELECTRODE ASSEMBLY FOR HIGH ENERGY DEVICES

[75] Inventor: Michael R. Nowaczyk, Colden, N.Y.

[73] Assignee: Wilson Greatbatch Ltd., Clarence, N.Y.

[21] Appl. No.: 09/112,528

[22] Filed: Jul. 8, 1998

[51] Int. Cl.[7] .................................................. H01M 4/00
[52] U.S. Cl. ........................... 429/94; 429/127; 429/152; 429/162; 29/623.1; 29/23.1
[58] Field of Search ............................. 429/162, 94, 152, 429/127

[56] References Cited

U.S. PATENT DOCUMENTS

| | | | |
|---|---|---|---|
| 2,470,826 | 5/1949 | McMahon | 175/41 |
| 2,512,874 | 6/1950 | Reynolds | 175/41 |
| 2,887,649 | 5/1959 | Peck | 317/260 |
| 2,919,390 | 12/1959 | Robinson et al. | 317/260 |
| 3,006,980 | 10/1961 | Story | 136/6 |
| 3,438,812 | 4/1969 | Cherney et al. | 136/6 |
| 3,663,721 | 5/1972 | Blondel et al. | 136/6 |
| 4,127,890 | 11/1978 | Rayburn | 361/309 |
| 4,127,891 | 11/1978 | Rayburn | 361/309 |
| 4,761,352 | 8/1988 | Bakos et al. | 429/94 |
| 5,359,487 | 10/1994 | Carrico et al. | 361/301.5 |
| 5,439,760 | 8/1995 | Howard et al. | 429/94 |
| 5,458,997 | 10/1995 | Crespi et al. | 429/219 |
| 5,478,668 | 12/1995 | Gozdz et al. | 429/127 |
| 5,486,215 | 1/1996 | Kelm et al. | 29/623.1 |
| 5,534,368 | 7/1996 | Morris et al. | 429/152 |
| 5,603,737 | 2/1997 | Marincic | 29/23.1 |
| 5,635,312 | 6/1997 | Yanagisawa et al. | 429/94 |
| 5,888,667 | 3/1999 | Cheong | 429/94 |
| 5,925,482 | 7/1999 | Yamashita | 429/130 |
| 5,935,728 | 8/1999 | Spillman | 429/94 |

Primary Examiner—Maria Nuzzolillo
Assistant Examiner—Mark Ruthkosky
Attorney, Agent, or Firm—Hodgson Russ Andrews Woods & Goodyear LLP

[57] ABSTRACT

An electrode assembly constructed of continuous anode and cathode electrode that are overlaid in overlapping fashion and folded several times rather than wound into a cylinder in the conventional "jelly roll" electrode assembly. The electrode assembly has a first side that is curved substantially along a single arc and a second side opposite the first side that is curved substantially along a plurality of arcs. The electrode assembly is designed for casings for electrochemical cells or batteries having profiles that are not well suited for the jelly roll configuration.

20 Claims, 4 Drawing Sheets

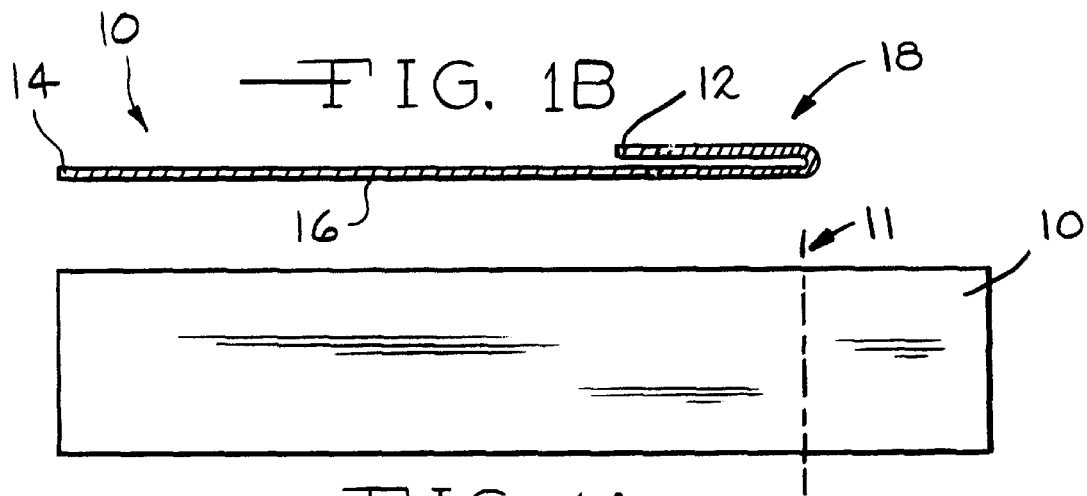
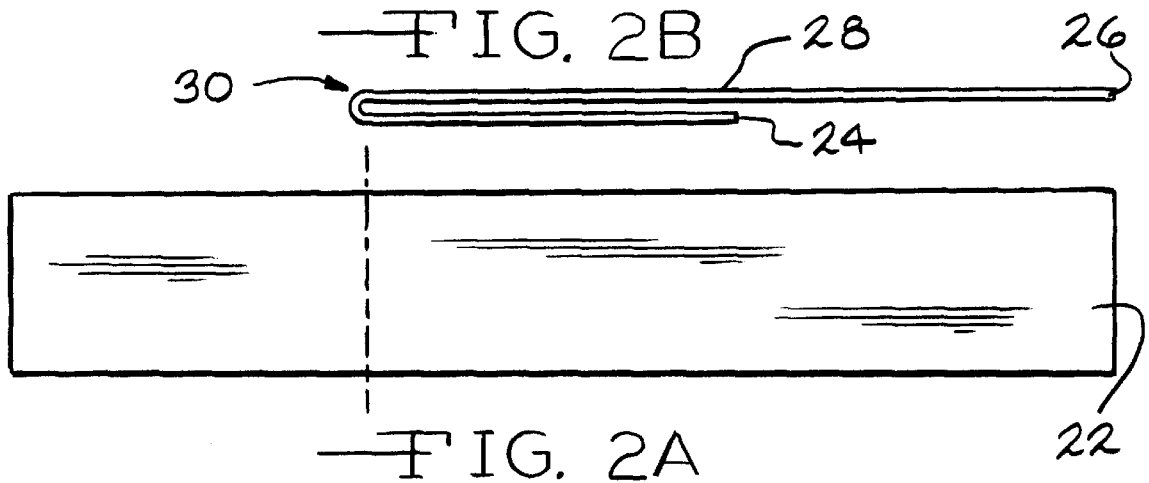

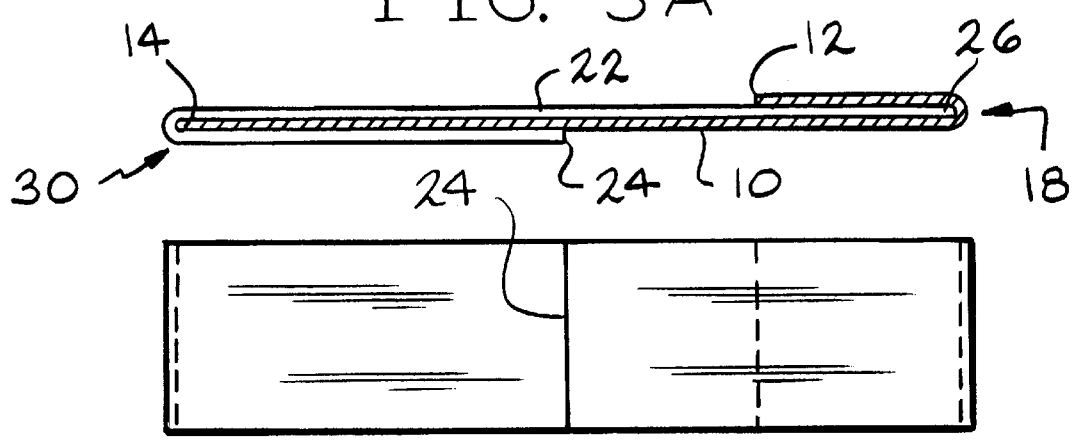
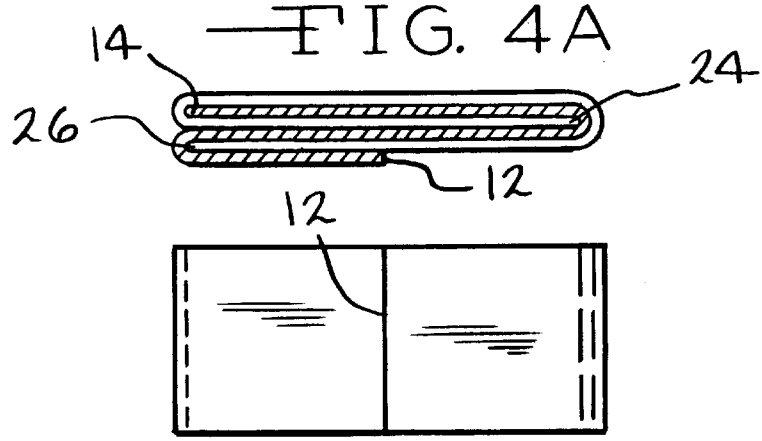
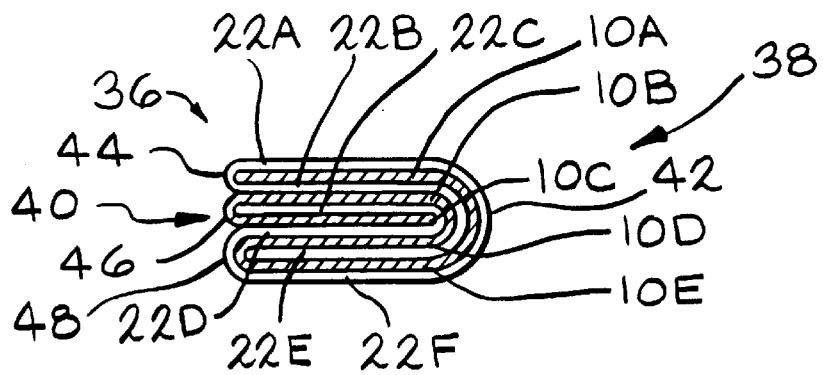

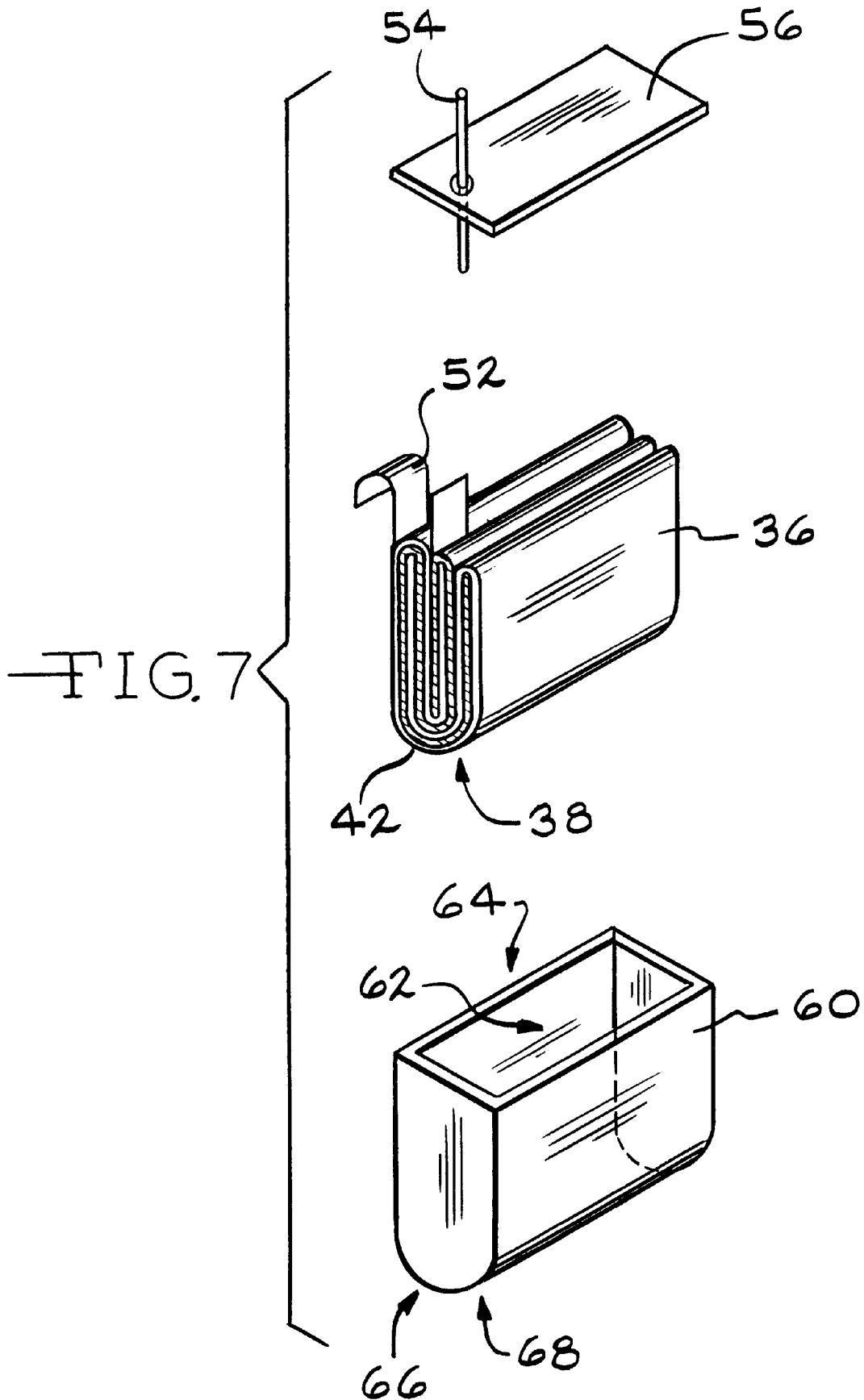

ELECTRODE ASSEMBLY FOR HIGH ENERGY DEVICES

FIELD OF THE INVENTION

The present invention generally relates to the art of electrochemical energy, and more particularly, to an electrode assembly, electrochemical cells in which the electrode assembly is used and a method for making the electrode assembly.

BACKGROUND OF THE INVENTION

Batteries or electrochemical cells are typically volumetrically constrained systems which cannot exceed the available volume of the battery case. The size and resulting volume of the battery case are dictated by the space requirements available for the particular application. The components that make up a battery namely, the cathode electrode, the anode electrode, the separator, the current collectors, and the electrolyte all have to fit into the limited space defined by the battery case. Therefore, the arrangement of the components impacts on the amount of active electrode material that can be fit into the case and the ease of manufacturing the unit.

Some typical electrode assemblies include the "Z" folded electrode assembly which is disclosed in U.S. Pat. No. 3,663,721 to Blondel et al. In the "Z" folded electrode, a unitary and continuous lithium anode is folded back and forth in a zig-zag fashion. The length of the individual folds determines the width of the electrode assembly. Individual cathode plates are positioned between pairs of the pleated anode electrode and electrically connected to one another. The design has some drawbacks including the requirement that separate cathode plates be inserted between each pair of adjacent layers of anode electrode, and the requirement that electrical connections be made between all of the inserted cathode plates. This arrangement increases the time and costs associated with manufacturing.

Another typical electrode assembly configuration is the "jelly rolls" design in which the anode electrode, the cathode electrode, and the separator are overlaid with respect to each other and coiled up. Such an electrode configuration is desirable because the continuous anode and cathode electrodes require a minimal number of mechanical connections to their respective terminal leads, and the jelly roll assembly is generally recognized as preferred for high discharge and current pulse applications. However, in some applications, a cylindrically shaped electrode assembly is not desired because of other factors such as the shape of the battery case.

U.S. Pat. No. 4,761,352 to Bakos et al. discloses yet another electrode assembly design comprising an accordion folded electrode assembly with unitary members for both the anode and cathode electrode strips. The cathode strip is approximately half the length of the anode strip and the anode strip is folded over the cathode strip to "sandwich" the cathode between two layers of the anode. The resulting form is then manually folded in an alternating series of "V" folds (best shown in FIG. 4 of the patent). However, that design provides some undesirable gaps which reduce the volumetric density of the electrochemically active materials.

What is needed is an improved multilayer, folded electrode assembly design for high energy devices that includes many of the desirable features of the jelly roll design such as unitary anode and cathode electrodes.

SUMMARY OF THE INVENTION

The present invention fills the above described need by providing an electrode assembly including an anode strip, a cathode strip, and an intermediate separator that are folded together such that the shape of the resulting assembly is defined on one side by a single arc and defined on the opposite side by a plurality of arcs.

The present invention also comprises a method for forming an electrode assembly including the following steps. The anode and cathode electrodes are folded over at the ends to form respective loops and then are overlaid such that the flat end of each electrode terminates inside the loop formed on the other electrode. The combined anode and cathode electrodes are then folded approximately in half, and then folded again approximately in half to form the final electrode assembly. In the preferred embodiment, the final electrode assembly curves along a single arc on one side and curves along three arcs on the opposite side. However, depending on the available space and the energy requirements, the electrode assembly can be made wide enough to accommodate additional folds.

In an alternate embodiment, the anode and cathode electrodes are folded into loops at both ends. The loops are formed by folding the ends of the electrode over a portion of the body of the electrode. The anode and cathode electrodes are then placed in alignment such that the end of each of the electrodes nests in the loop of the other electrode. The loops function to ensure alignment of the anode and cathode electrodes during the initial fold. The combined anode and cathode electrodes are then folded approximately in half, and then folded again approximately in half to form the final electrode assembly.

It is an object of the invention to provide an electrode assembly having multiple layers of anode electrode and cathode electrode such that a first side is curved along a single arc and a second side opposite the first side is curved along a plurality of arcs.

Accordingly, the electrode assembly of the present invention offers many advantages including ensuring alignment between the electrode layers, enhancing the volumetric density of the electrode assembly, and maximizing the surface area for interaction of the anode and cathode active materials.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

FIG. 1A is a plan view of the cathode strip of the present invention.

FIG. 1B is a side elevation view of the cathode strip shown in FIG. 1A after making an initial fold.

FIG. 2A is a plan view of the anode strip of the present invention.

FIG. 2B is a side elevation view of the anode strip shown in FIG. 2A after making an initial fold.

FIG. 3A is a side elevation view of the combined anode and cathode electrodes.

FIG. 3B is a bottom plan view of the combined anode and cathode electrodes shown in FIG. 3A.

FIG. 4A is a side elevation view of the combined anode and cathode electrodes after an initial fold of the combined electrodes.

FIG. 4B is a bottom plan view of the combined anode and cathode electrodes shown in FIG. 4A after the initial fold of the combined electrodes.

FIG. 5 is a side elevation view of the combined anode and cathode electrodes after the final fold of the combined electrodes.

FIG. 7 is an exploded perspective view of an alternate embodiment of an electrochemical cell comprising the electrode assembly of the present invention.

DETAILED DESCRIPTION OF THE INVENTION

Figure 6:
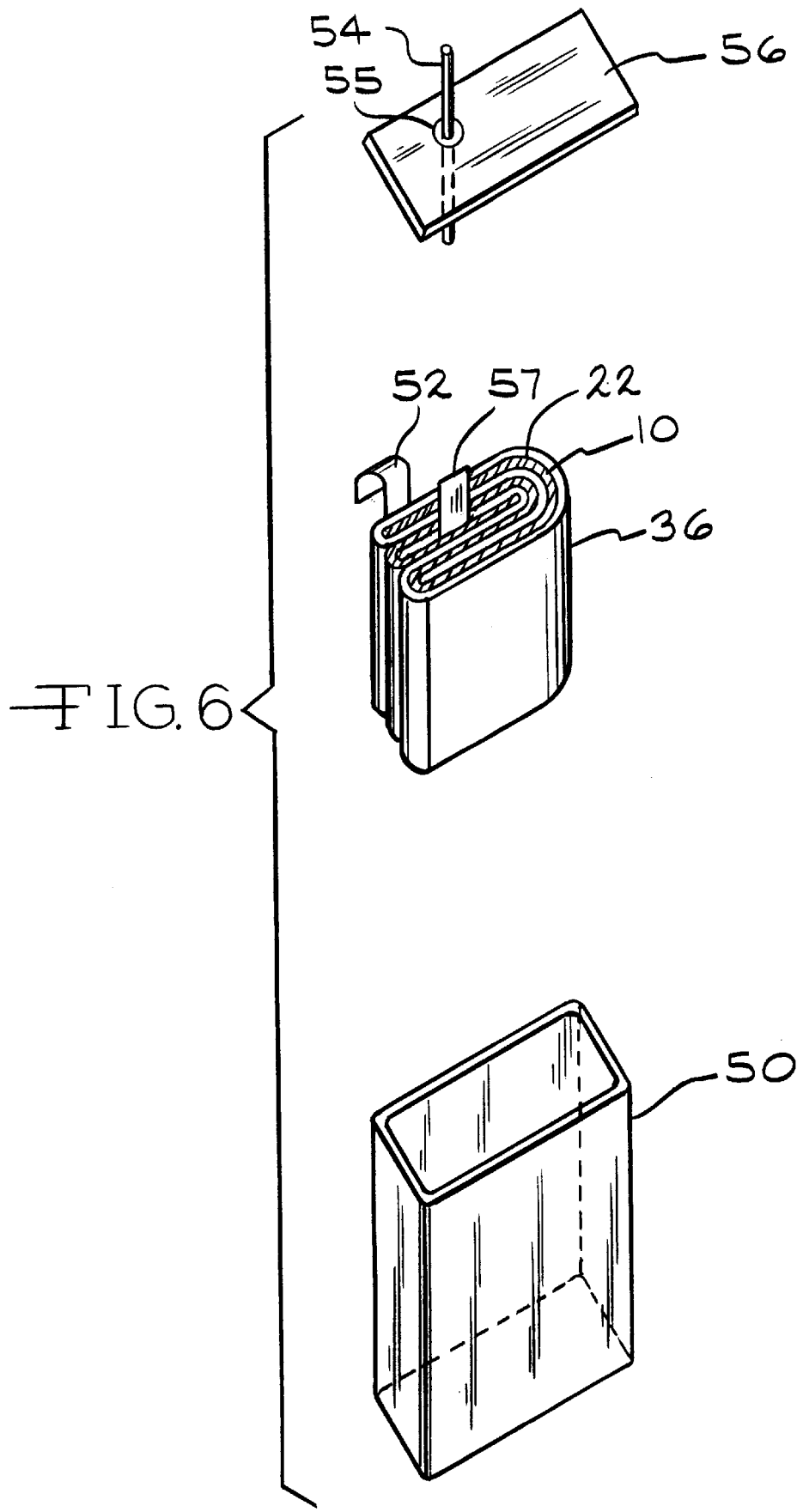
FIG. 6 is an exploded perspective view of an electrochemical cell including an electrode assembly of the present invention.

The present invention is designed for high energy devices such as batteries and capacitors and is adaptable in a wide variety of electrode configurations and shapes for such applications as capacitors and batteries including aqueous and nonaqueous primary and secondary batteries.

Referring to FIG. 1A, a cathode strip 10 is preferably a continuous structure comprising a cathode active material combined with a cathode current collector. The active material for the cathode strip 10 is preferably comprised of a metal, a metal oxide, a metal sulfide, a mixed metal oxide, a carbonaceous material, or the like and is combined with a current collector of a conductive material such as a conductive screen. The cathode strip 10 is preferably in the form of an elongated, rectangular strip but other shapes and sizes would also be suitable as the strip 10 can be scalloped to match different shaped devices. A fold line 11 is indicated across the cathode strip 10.

Turning to FIG. 1B, the cathode strip 10 is preferably constructed of a malleable material that is capable of being folded. The cathode strip 10 has a first end 12 and a second end 14 positioned opposite the first end 12. A body 16 is disposed between the two ends 12 and 14. The end 12 of the cathode strip 10 is folded over a portion of the body 16 (along fold line 11) to form a loop 18. In an alternate embodiment, both ends 12 and 14 are folded over a portion of the body 16 to form two loops 18.

In FIG. 2A, an anode strip 22 is a continuous structure comprising an anode active material and an anode current collector. The anode current collector is comprised of a conductive material such as of a conductive screen and the like. The anode strip 22 is preferably elongated and rectangular in shape, although other shapes and sizes are also suitable as the strip 22 can be scalloped to match different shaped devices. A fold line 23 is indicated across the anode strip 22.

As shown in FIG. 2B, the anode strip 22 is preferably constructed of a malleable material that is capable of being folded. The anode strip 22 has a first end 24 and a second end 26 opposite the first end 24. A body 28 is disposed between the first end 24 and the second end 26. The end 24 of the anode strip 22 is folded over a portion of the body 28 to form a loop 30. As an alternate embodiment, both ends 24 and 26 can be folded over the body 28 to form two loops 30.

Turning to FIG. 3A, the cathode strip 10 and the anode strip 22 are overlaid such that the end 14 of the cathode strip 10 terminates inside the loop 30 of the anode strip 22 at the opposite end. The end 26 of the anode strip 22 terminates inside the loop 18 of the cathode strip 22. This alternating overlap at the ends 14 and 26 ensures that the anode strip 22 and the cathode strip 10 maintain alignment and overlap in the initial fold described below. This arrangement also provides for a large surface area where the anode active material of the anode strip 22 and the cathode active material of the cathode strip 10 interface. A separator (not shown for purposes of clarity) is disposed intermediate the cathode strip 10 and the anode strip 22 to prevent direct physical contact between them.

In FIG. 3B, a bottom plan view of the combined cathode strip 10 and anode strip 22 is shown with the end 24 of the anode strip 22 indicated at the approximate midpoint of the combination. The combined cathode strip 10 and anode strip 22 are folded about the end 24 of the anode strip 22 to form the electrode assembly shown in FIG. 4A. Both ends 24 and 26 of the anode strip 22 are then positioned between contiguous layers of the cathode strip 10. The only remaining exposed edge is the end 12 of the cathode strip 10.

In FIG. 4B the bottom of the folded combination is shown with end 12 of the cathode strip 10 located at the approximate midpoint of the folded combination. The folded combination is then folded again about the end 12 to produce the electrode assembly shown in FIG. 5.

In FIG. 5 an electrode assembly 36 is shown which has a first side 38 and a second side 40 positioned opposite from the first side 38. The first side 38 is curved substantially along a single arc 42 that spans the height of the electrode assembly 36. The second side 40 is curved substantially along three arcs 44, 46, and 48. The number of arcs will vary depending on the number of folds. By extending the width of the electrode assembly 36 shown in FIG. 5, another fold could be made to produce another arc on the second side 40. The number and sequence of folds is determined by the energy requirements for the device. The resulting electrode assembly 36 includes six planar anode plates 22A, 22B, 22C, 22D, 22E and 22F formed by the folded continuous anode strip 22 and five planar cathode plates 10A, 10B, 10C, 10D and 10E formed therein by the folded continuous cathode strip 10 and interleaved between the anode plates, but the invention is not limited to that number of plates. The configuration of the arcs 42, 44, 46, and 48 provides many advantages including the ability to conform the single arc 42 to the curvature of battery cases. The design ensures alignment between the anode and cathode electrodes by fixing each of the ends 12, 14, 24, and 26 between contiguous electrode layers.

Turning to FIG. 6, one of the advantages of the present invention is the ability to maximize the volumetric density of the electrochemical cell by having the electrode assembly 36 capable of conforming to many shapes including the shape of a typical rectangular case 50. An electrode lead 52 is shown connected to the anode strip 22 and having an end for attachment to the case 50 for a "case negative" configuration. A terminal pin 54 is electrically insulated from the case 50 by an insulator material 55, preferably of glass, to prevent electrical contact with the case and provide for connection from the external circuit to a lead 57 electrically connected to the cathode strip 10. A cover 56 is hermetically sealed to the open end of the case 50 and is provided with an electrolyte fill opening (not shown) for activating the electrode assembly with an electrolyte solution provided therein. The electrolyte fill opening is also hermetically sealed once the electrochemical cell has been activated.

In FIG. 7, a case 60 is shown, which is an alternate embodiment of the case 50, and more closely conforms to the shape of the electrode assembly 36. The case 60 has a substantially rectangular surface 62 at a first side 64 and a curved surface 66 at a second side 68 opposite the first side 64. The curved surface 66 matches the arc 42 that is formed on the first side 38 of the electrode assembly 36. The electrode lead 52, terminal pin 54, and cover 56 are shown with respect to case 60.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An electrode assembly, comprising:
   a) an anode strip;
   b) a cathode strip disposed substantially parallel to the anode strip, the anode strip and the cathode strip being folded together such that the electrode assembly has multiple alternating layers of the anode strip and the cathode strip and such that a first side of the assembly curves substantially along a single arc and a second side opposite the first side curves substantially along a plurality of arcs; and
   c) a layer of an insulating separator material disposed between the anode strip and the cathode strip.

2. The electrode assembly of claim 1, wherein the anode strip is a unitary member.

3. The electrode assembly of claim 1, wherein the cathode strip is a unitary member.

4. The electrode assembly of claim 1, wherein the anode strip has a first end, a second end opposite the first end, and a body disposed therebetween.

5. The electrode assembly of claim 4, wherein the anode strip has at least one loop formed by folding one of the ends over a portion of the body.

6. The electrode assembly of claim 5, wherein the cathode strip has a first end, a second end opposite the first end, and a body disposed therebetween.

7. The electrode assembly of claim 6, wherein the cathode strip has at least one loop formed by folding one of the ends over a portion of the body.

8. The electrode assembly of claim 7, wherein the anode strip and cathode strip are disposed such that one of the ends of the anode strip terminates inside the loop of the cathode strip.

9. The electrode assembly of claim 8, wherein the anode strip and cathode strip are disposed such that one of the ends of the cathode strip terminates inside the loop of the anode strip.

10. The electrode assembly of claim 7, wherein the anode strip and the cathode strip are disposed such that one of the ends of the cathode strip terminates inside the loop of the anode strip.

11. The electrode assembly of claim 7, wherein the anode strip and the cathode strip each have two loops formed therein by folding each of the ends over a portion of the respective bodies.

12. The electrode assembly of claim 11, wherein the anode strip and the cathode strip are aligned such that the loops of the anode strip nest with the loops of the cathode strip.

13. The electrode assembly of claim 12, wherein the loops of the anode and cathode strips nest inside each other in alternating fashion at the opposite ends of the anode and cathode strips.

14. The electrode assembly of claim 1, wherein the anode strip is substantially rectangular.

15. The electrode assembly of claim 1, wherein the cathode strip is substantially rectangular.

16. A battery, comprising:
    a) an anode strip;
    b) a cathode strip disposed substantially parallel to the anode strip, the anode strip and the cathode strip being folded together such that the electrode assembly has multiple alternating layers of anode strip and cathode strip and such that a first side of the electrode assembly curves substantially along a single arc and a second side opposite the first side curves substantially along a plurality of arcs;
    c) a layer of an insulating separator material disposed between the anode strip and the cathode strip; and
    d) an electrolyte activating and operatively associating the anode strip and the cathode strip.

17. The battery of claim 16, wherein the anode strip is a unitary member.

18. The battery of claim 16, wherein the cathode strip is a unitary member.

19. A method of providing an electrode assembly, comprising the steps of:
    a) providing an anode strip having a first end, a second end opposite the first end, and a body disposed therebetween;
    b) folding one of the ends of the anode strip over a portion of the body of the anode strip to form an anode loop;
    c) providing a cathode strip having a first end, a second end opposite the first end, and a body disposed therebetween;
    d) folding one of the ends of the cathode strip over a portion of the body of the cathode strip to form a cathode loop;
    e) placing the anode strip and the cathode strip together with a separator therebetween to form a combined anode and cathode electrodes such that one of the ends of the anode strip terminates inside the cathode loop in the cathode strip and such that one of the ends of the cathode strip terminates inside the anode loop in the anode strip;
    f) folding the combined anode and cathode electrodes to form a folded, combined anode and cathode electrodes; and
    g) folding the folded, combined anode and cathode electrodes to form an electrode assembly having a first side that curves substantially along a single arc and having a second side opposite the first side that curves substantially along a plurality of arcs.

20. The method of claim 19 including folding the ends of the anode and cathode strip to form a second loop.

* * * * *